3,466,137
METHOD OF REMOVING RADIOIODINE VALUES FROM A GASEOUS MEDIUM
Wilfred T. Ward and Robert E. Adams, Oak Ridge, Tenn., assignors to the United States of America as represented by the United States Atomic Energy Commission
No Drawing. Filed May 23, 1967, Ser. No. 642,290
Int. Cl. B01d 47/06; C01b 2/30
U.S. Cl. 23—2                                    4 Claims

ABSTRACT OF THE DISCLOSURE

The removal of gaseous radioiodine values particularly methyl iodide from a gaseous atmosphere containing such values is accomplished by contacting the gas atmosphere with an aqueous solution containing ammonium sulfide.

---

The present invention relates generally to the removal of iodine values from gaseous atmospheres containing the same, and more particularly to a method of trapping gaseous radioiodine values of various forms including molecular iodine, methyl iodide, and other organic and inorganic iodides from a gaseous medium by contacting the latter with an ammonium sulfide solution. This invention was made in the course of, or under, a contract with the U.S. Atomic Energy Commission.

In environments where radioiodine values are present or potentially present, safeguards and precautions must be exercised to minimize or obviate the escape of these values into the atmosphere since the inhalation of this material is extremely hazardous. Radioactive iodine ($I^{131}$) is formed by the fission of nuclear material, and radioiodines are apparently released upon the melting of nuclear fuel elements and/or formed by a number of chemical reactions between $I^{131}$ and other substances. These iodine values may be in the form of an elemental vapor, molecular iodine attached to air-borne particulates, or in the form of organic or inorganic iodides resulting from the combination of the elemental iodine with organic or inorganic substances, respectively. Of the several organic radioiodine values formed, methyl iodide ($CH_3I$) is usually the most plentiful of the organic iodides identified.

In view of the health hazards attendant with the formation of radioiodines, elaborate filtering systems have been developed for removing such iodines from process or ventilation gas-streams such as those associated with nuclear reactor fuel processing operations, nuclear reactor ventilating systems, hot-laboratory off-gases, etc. The development of these filtering systems was somewhat hampered by the fact that while elemental iodine and forms of non-organic iodine compounds were more or less readily collected by the filtering systems, methyl iodide and other volatile organic iodides presented a much more difficult filtration problem due to their highly penetrative nature. Perhaps one of the more successful filtering systems for trapping these volatile radioactive substances is the use of activated charcoal beds impregnated with natural iodine. Apparently, when employing these beds the organic radioiodine values exchange with the previously fixed natural iodine in the bed and become quite firmly held.

While the radioiodine values including methyl iodide are relatively easily and efficiently retained by the charcoal beds under conditions normally encountered, it has been found that the methyl iodide retention capabilities of the charcoal beds drop off rapidly in the presence of water vapor. In other words, where the methyl iodide may be removed from the effluent gas stream with efficiencies greater than 99 percent in dry air and possibly up to relatively moderate humidities, e.g., 70 percent relative humidity, the methyl iodide removal efficiency may drop as the humidity increases to a point near zero where the methyl iodide is borne by water-saturated gases (100 percent relative humidity). At this high relative humidity bulk water may be associated with the charcoal beds to effectively plug the pores and thereby seriously impair the adsorption of the methyl iodide. Another possible shortcoming of the charcoal beds is that a possible fire-hazard may be present when using such beds due to the radioactive decay of the trapped material in the charcoal beds.

The poor trapping of methyl iodide when air-borne by water-saturated gases presents a significant problem in the development of pressurized and boiling water nuclear reactors from a standpoint of health physics. Of primary concern is the containment and handling of radioactive materials that would be released in and possibly from the reactor containment vessels in the event a nuclear accident occurs since the filtering systems associated with the reactor may be subjected to excessive quantities of water vapor so as to impair their methyl iodide removal or trapping capabilities. In the larger reactors the employment of pressure suppression systems such as containment pools or sprays which effectively reduce the pressure by quenching steam would add even more water to the containment vessel atmosphere and thereby further aggravating the problem of removing the methyl iodide.

Investigations have been conducted in an effort to provide a mechanism for effectively trapping or removing the volatile radioactive methyl iodide from water-saturated gaseous effluent. An approach considered promising was the use of a solution which upon contacting radioiodine values including methyl iodide is capable of effectively trapping the radioiodines. Solutions of this type have been previously employed in off-gas systems of isotope and nuclear fuel processing facilities for the trapping of radioactive gases. Of these previously known solutions, aqueous solutions containing various concentrations of ammonium hydroxide, sodium hydroxide, sodium thiosulphate, or hydrazine have been investigated as possible methyl iodide and other volatile organic trapping agents. However, while these solutions exhibit satisfactory effectiveness in trapping molecular radioiodines and some degree of effectiveness in trapping methyl iodides and other organic iodides the concentrations of the solutions necessary to trap such organic iodides as well as their relatively low efficiencies (except for possibly hydrazine at relatively high concentrations) in such trapping applications appear to render these solutions not sufficiently desirable or practical for the envisioned employment in nuclear reactor safing systems.

It is the aim of the present invention to minimize or obviate the above and other problems or drawbacks suffered by the previously known radioactive filtering or trapping systems by providing an aqueous solution capable of effectively removing radioiodine values including methyl iodide and other organic iodides from gaseous effluents associated with nuclear reactors, reactor fuel processing and isotope preparation facilities, hot laboratories, etc. The radioiodine trapping solution of the present invention found to achieve these goals consists essentially of an aqueous solution containing ammonium sulfide that selectively sorbs methyl iodide with an efficiency greater than 99 percent with ammonium sulfide concentrations as low as about 1.0 weight percent.

An object of the present invention is to provide for the removal of air-borne radioiodine values from atmospheres containing the same.

Another object of the present invention is to provide an aqueous solution containing ammonium sulfide for effecting the trapping of radioiodine values including methyl iodide and other volatile organic iodides from gaseous atmospheres containing the same.

A further object of the present invention is to provide for the removal of methyl iodide in gaseous effluents associated with nuclear reactors, radioactive materials processing facilities, metallurgical hot cells, burning organic materials, etc., regardless of water content in such effluents.

Other and further objects of the invention will be obvious upon an understanding of the illustrative matter about to be described or will be indicated in the appended claims, and various advantages not referred to herein will occur to one skilled in the art upon employment of the invention in practice.

In the following detailed description of the present invention the use of the ammonium sulfide solution is directed primarily to the trapping of gaseous radioactive methyl iodide. However, it should be understood that the ammonium sulfide solution of this invention may be successfully employed as a trapping agent for other forms of iodine such as molecular iodine and organic or inorganic iodine compounds.

In accordance with the present invention methyl iodide is selectively sorbed from a gaseous effluent containing the same by contacting the effluent with an aqueous ammonium sulfide solution. This contacting may be accomplished in any suitable manner such as by spraying the solution in the form of fine droplets into an atmosphere containing gaseous methyl iodide, by bubbling the methyl iodide containing effluent through a column of the solution, by utilizing the solution in conventional gas-scrubbers, etc.

Initial investigations with the aqueous ammonium sulfide solutions provided data indicating that virtually all (approximately 99.9+ percent) of the methyl iodide in the gaseous effluent contacted with the solution was removed when the ammonium sulfide concentration was 12.0 weight percent with the solution at a temperature of about 25° C. (approximately room temperature). It was also found that solutions containing ammonium sulfide in concentrations as low as about 1.0 weight percent removed more than 99.5 percent of the methyl iodide when effluent containing the latter was contacted under similar conditions. Increasing the ammonium sulfide concentration to 5.0 weight percent resulted in a methyl iodide removal efficiency of about 99.9 percent which represents a slight increase over the efficiency of the 1.0 percent solution. However, since the 1.0 percent ammonium sulfide solution provides a methyl iodide trapping efficiency unexpectedly approaching that of solutions with substantially greater concentrations of ammonium sulfide and also well above an efficiency believed necessary from a health physics standpoint, the employment of solutions with greater than about 1.0 percent ammonium sulfide concentrations does not appear to be advantageous.

The ammonium sulfide concentrations are preferably maintained above about 1.0 percent since solutions containing less ammonium sulfide do not enjoy the removal efficiency of the 1.0 percent solutions particularly when the solutions are at approximately room temperature. For example, with a 0.1 percent ammonium sulfide solution an efficiency of about 85 percent is obtained with the solution at a temperature of about 25° C. Increasing the temperature of the solution to about 50° C. results in a removal efficiency of about 98 percent which may be satisfactory for many operations, e.g., columns, gas-scrubbers, etc., particularly where a filtering system such as activated charcoal is used downstream of the solution.

An increase in the temperature of the 1.0 percent ammonium sulfide solution also results in an increase in methyl iodide trapping efficiency. For example, with the solution at a temperature of 50° C., approximately 99.98 percent of the methyl iodide in the effluent is trapped by the solution when contacted therewith. Further temperature increases may additionally enhance the methyl iodide removal efficiencies of the solutions, but with the efficiencies already approaching 100 percent only a very small increase in efficiency is obtainable.

While it is believed that ammonium sulfide solution effects the methyl iodide trapping by a chemical reaction, the exact mechanism by which such trapping is obtained is not clearly understood at the present time. However, for the purpose of this invention it is known that the ammonium sulfide solutions selectively sorb the methyl iodide from gaseous effluents contacted with solution and that the iodine is trapped in the solution.

In order to provide a better understanding of the present invention and to further illustrate the methyl iodide sorbing effectiveness of the ammonium sulfide solutions, examples of methyl iodide trapping tests are set forth below. In each of these examples, 800 ml. of the ammonium sulfide solution was placed in a column and a gas stream containing methyl iodide bubbled through the column. A fritted disc was utilized at the base of the column to provide uniform gas distribution therethrough. The gas emerging from the column was then passed through two natural iodine-impregnated charcoal beds disposed in series to sorb any remaining methyl iodide. The effectiveness of the solution was calculated by using the activities measured in the solution and in the charcoal beds at the conclusion of the test.

EXAMPLE I

Gaseous radioactive methyl iodide ($CH_3^{131}$) was bubbled through a 28-inch tall column of 12 weight percent ammonium sulfide solution for 70 minutes. The effluent gas from the column was passed through two serially connected beds of impregnated charcoal. This methyl iodide contacting operation was followed by an 18 hour air sparge with the effluent gas from the column again passing through the charcoal beds. These operations were conducted at room temperature (approximately 25° C.). A 20 ml. sample of the solution was counted and provided a gross activity of 11,440 counts/min. The normal back ground count was 390 counts/min.; the first charcoal bed measured 425 counts/min.; the second bed measured the same as background. The removal of methyl iodide for this ammonium sulfide solution was calculated to be 99.992 percent.

EXAMPLE II

Another room temperature test was made with a 1.0 weight percent ammonium sulfide solution. The methyl iodide was bubbled through the solution for 50 minutes and the air sparge lasted 21 hours. A 20 ml. sample of the solution gave an activity reading of 5385 counts/min.; the background was 400 counts/min. The first charcoal bed read 1175 counts/min. and the second was again the same as background. The methyl iodide trapping efficiency of this solution was calculated to be 99.61 percent.

EXAMPLE III

The 1.0% solution of ammonium sulfide was tested at a temperature of 50° C. The methyl iodide was bubbled through this solution for 2 hours and the air sparge lasted about 20 hours. The background activity was 340 counts/min.; a 20 ml. sample measured 3435 counts/min.; and the charcoal beds measured, respectively, 360 and 350 counts/min. The methyl iodide sorbing efficiency for the 1.0 percent solution at 50° C. was calculated to be 99.97 percent.

It will be seen that the present invention sets forth a highly efficient mechanism for removing methyl iodide and other radioiodine values from gaseous effluents, even when considerable moisture is present in the effluent since the presence of such moisture has no effect on the ammonium sulfide solutions. It is believed that the ammonium sulfide solution of the present invention will be compatible with structural materials particularly since relatively minor concentrations of ammonium sulfide have proven to be so effective. As mentioned above the ammonium sulfide solution is expected to sorb molecular iodine since experience has shown that any good sorbent for methyl iodide and other organic iodides is also a good sorbent for gaseous iodine.

Inasmuch as pressurized and boiling water-type nuclear reactors are apparently of primary interest in future reactor development, it is expected the ammonium sulfide solution of the present invention will enjoy usage in the safing systems of such reactors. This premise is based upon the fact that charcoal absorbers alone are not considered as being sufficiently effective in the very humid post-accident environment to remove the expected radioactive methyl iodide. Thus, some pretreatment of the methyl iodide bearing effluents is assumed to be necessary. While investigators have suggested the employment of various solutions for use as a methyl iodide trapping spray, preliminary investigations indicate that none of the known prior art solutions are as effective as believed desirable. On the other hand, these preliminary studies indicate that a rather dilute solution of ammonium sulfide is very effective and thus may be highly useful as the spray solution to quench steam in or around a reactor pressure vessel and remove much of the methyl iodide and like organic iodides, iodine, and perhaps other gaseous fission products. Similarly, this solution may be useful in the aqueous pools suggested for pressure suppression. When the moisture in the reactor environment has been reduced, the remaining gases could be passed through impregnated charcoal to sorb other radioactive substances.

As various changes and modifications may be made in the ammonium sulfide solutions as well as in the procedures of contacting and sorbing radioiodines without departing from the spirit and scope of the invention and without sacrificing any of its advantages, it is to be understood that all matter herein is to be interpreted as illustrative and not in a limiting sense.

What is claimed is:

1. A method of removing radioiodine values from a gaseous medium containing said values by contacting the gaseous medium with an aqueous solution containing ammonium sulfide.

2. A method of removing radioiodine values as claimed in claim 1, wherein the gaseous medium contains methyl iodide, and wherein the ammonium sulfide in the solution is in a concentration sufficient to selectively sorb greater than 99 percent of the methyl iodide from the gaseous medium contacted by the solution when the solution is at a temperature of about 25° C.

3. A method of removing radioiodine values as claimed in claim 2, wherein the solution contains a concentration of ammonium sulfide corresponding to at least about 1.0 weight percent of the solution.

4. A method of removing radioiodine values as claimed in claim 2, wherein the contacting of the gaseous medium with the solution is provided by discharging the solution into the gaseous medium in the form of fine droplets.

References Cited

UNITED STATES PATENTS

| | | | |
|---|---|---|---|
| 3,338,665 | 8/1967 | Silverman | 23—2 |
| 3,429,655 | 2/1969 | Case | 23—2 |

OSCAR R. VERTIZ, Primary Examiner

E. C. THOMAS, Assistant Examiner

U.S. Cl. X.R.

23—216